(12) United States Patent
Chen et al.

(10) Patent No.: US 10,356,864 B2
(45) Date of Patent: Jul. 16, 2019

(54) LED DRIVER WITH SILICON CONTROLLED DIMMER, CIRCUIT MODULE AND CONTROL METHOD THEREOF

(71) Applicant: Silergy Semiconductor Technology (Hangzhou) LTD, Hangzhou, ZheJiang Province (CN)

(72) Inventors: Huiqiang Chen, Hangzhou (CN); Jianxin Wang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 15/927,256

(22) Filed: Mar. 21, 2018

(65) Prior Publication Data

US 2018/0295690 A1 Oct. 11, 2018

(30) Foreign Application Priority Data

Apr. 6, 2017 (CN) .......................... 2017 1 0219915

(51) Int. Cl.
*H02J 1/00* (2006.01)
*H02J 1/04* (2006.01)
*H05B 33/08* (2006.01)
*H05B 37/02* (2006.01)

(52) U.S. Cl.
CPC ............ *H05B 33/0845* (2013.01); *H02J 1/04* (2013.01); *H05B 33/0809* (2013.01); *H05B 37/02* (2013.01); *H02J 2001/002* (2013.01)

(58) Field of Classification Search
CPC ........................................................ H02J 1/04
See application file for complete search history.

(56) References Cited

U.S. PATENT DOCUMENTS

| 4,728,866 A * | 3/1988 | Capewell ................ H02M 1/44 |
| | | 315/194 |
| 8,614,551 B2 * | 12/2013 | Chen .................. H05B 33/0815 |
| | | 315/194 |
| 8,890,372 B2 * | 11/2014 | Garb .................. H01R 13/6675 |
| | | 307/140 |
| 9,125,270 B2 * | 9/2015 | Liao .................... H05B 33/0845 |
| 9,301,352 B2 * | 3/2016 | Zhu ..................... H05B 33/0815 |
| 9,408,269 B2 * | 8/2016 | Zhu ........................ H05B 37/02 |
| 9,420,644 B1 * | 8/2016 | Shum ................... H05B 33/089 |
| 9,578,706 B1 * | 2/2017 | Lai ...................... H05B 33/0845 |
| 9,936,552 B1 * | 4/2018 | Lau .................... H02M 3/33507 |
| 10,037,859 B2 * | 7/2018 | Jin .......................... H01H 37/32 |
| 10,069,406 B2 * | 9/2018 | Huang ..................... H02M 1/44 |
| 10,194,500 B2 * | 1/2019 | Zhu ........................ H05B 37/02 |

(Continued)

*Primary Examiner* — Dion Ferguson
*Assistant Examiner* — Srinivas Sathiraju
(74) *Attorney, Agent, or Firm* — Michael C. Stephens, Jr.

(57) ABSTRACT

An apparatus can include: a bleeder circuit coupled to a DC bus of an LED driver having a silicon-controlled dimmer, where the bleeder circuit is controlled to discharge a current of the DC bus; a controller configured to control the bleeder circuit to discharge the DC bus at a first current after detecting a transition in a voltage of the DC bus; and the controller being configured to control the bleeder circuit to discharge the DC bus at a second current until the DC bus voltage rises to a predetermined load driving voltage, where the second current is less than the first current.

20 Claims, 9 Drawing Sheets

(56) References Cited

U.S. PATENT DOCUMENTS

| | | | |
|---|---|---|---|
| 2011/0163600 A1* | 7/2011 | Garb | H01R 13/6675 307/35 |
| 2014/0062322 A1* | 3/2014 | Yu | H05B 33/0851 315/200 R |
| 2014/0132172 A1* | 5/2014 | Zhu | H05B 37/02 315/210 |
| 2014/0300289 A1* | 10/2014 | Zhu | H05B 33/0815 315/206 |
| 2014/0346973 A1* | 11/2014 | Zhu | H05B 37/02 315/307 |
| 2016/0156275 A1* | 6/2016 | Ilic | H05B 33/0806 315/209 R |
| 2018/0295685 A1* | 10/2018 | Wang | H05B 33/0845 |
| 2018/0295690 A1* | 10/2018 | Chen | H05B 33/0845 |
| 2018/0310376 A1* | 10/2018 | Huang | H05B 33/0824 |

* cited by examiner

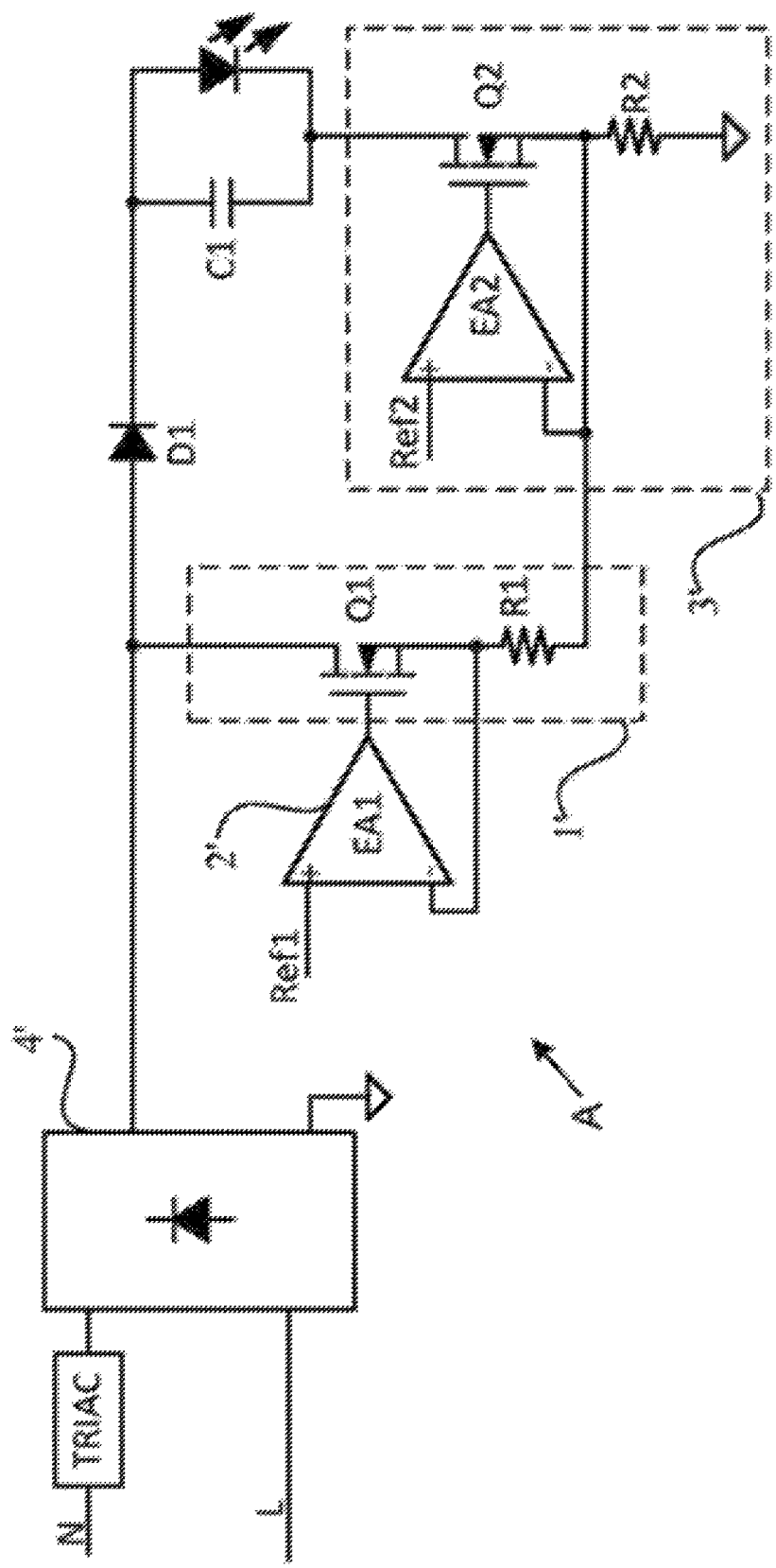
FIG. 1 (conventional)

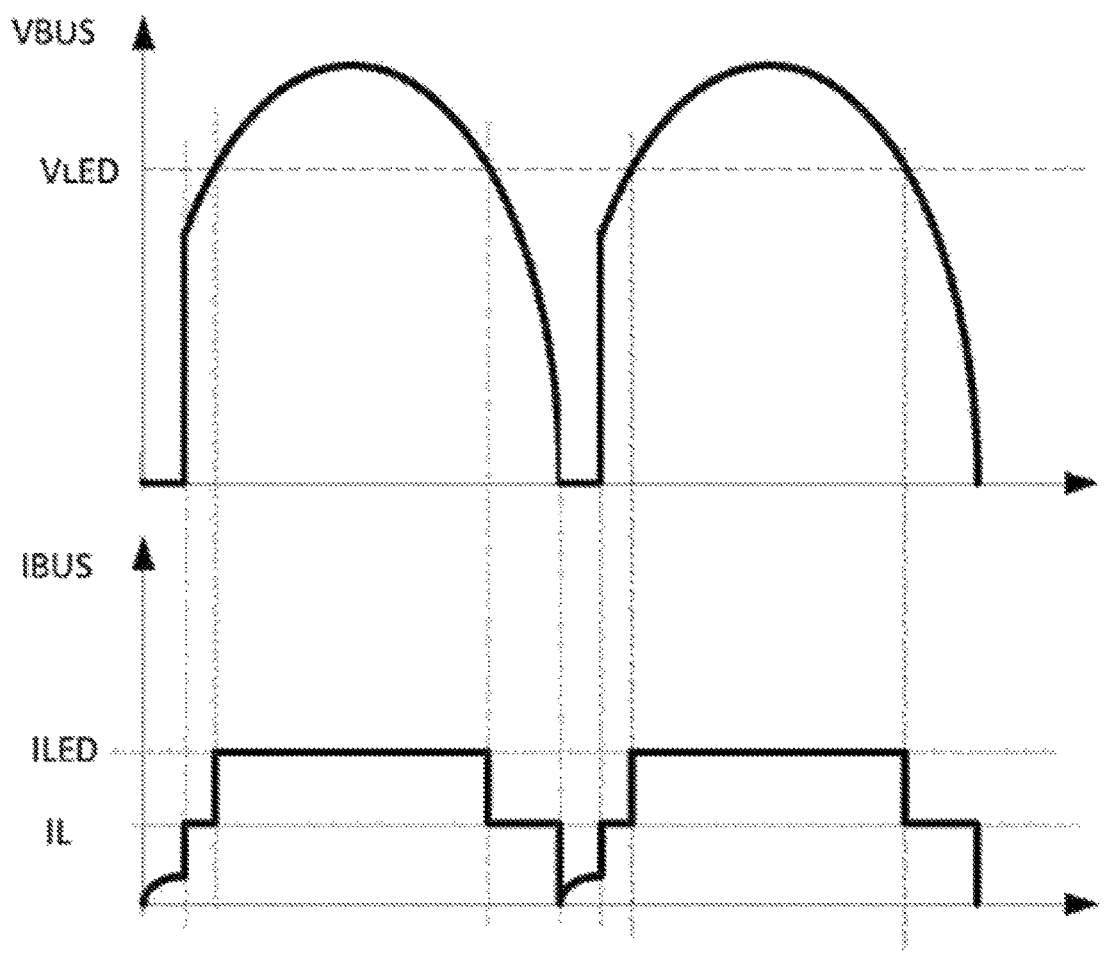
FIG. 2 (conventional)

LED DRIVER WITH SILICON CONTROLLED DIMMER, CIRCUIT MODULE AND CONTROL METHOD THEREOF

RELATED APPLICATIONS

This application claims the benefit of Chinese Patent Application No. 201710219915.5, filed on Apr. 6, 2017, which is incorporated herein by reference in its entirety.

FIELD OF THE INVENTION

The present invention generally relates to the field of power electronics, and more particularly to an LED driver with a silicon-controlled dimmer, along with associated circuits and methods.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

BRIEF DESCRIPTION OF THE DRAWINGS

FIG. 1 is a schematic block diagram of an example LED driver.

FIG. 2 is a waveform diagram of example operation of the LED driver of FIG. 1.

DETAILED DESCRIPTION

Figure 3:
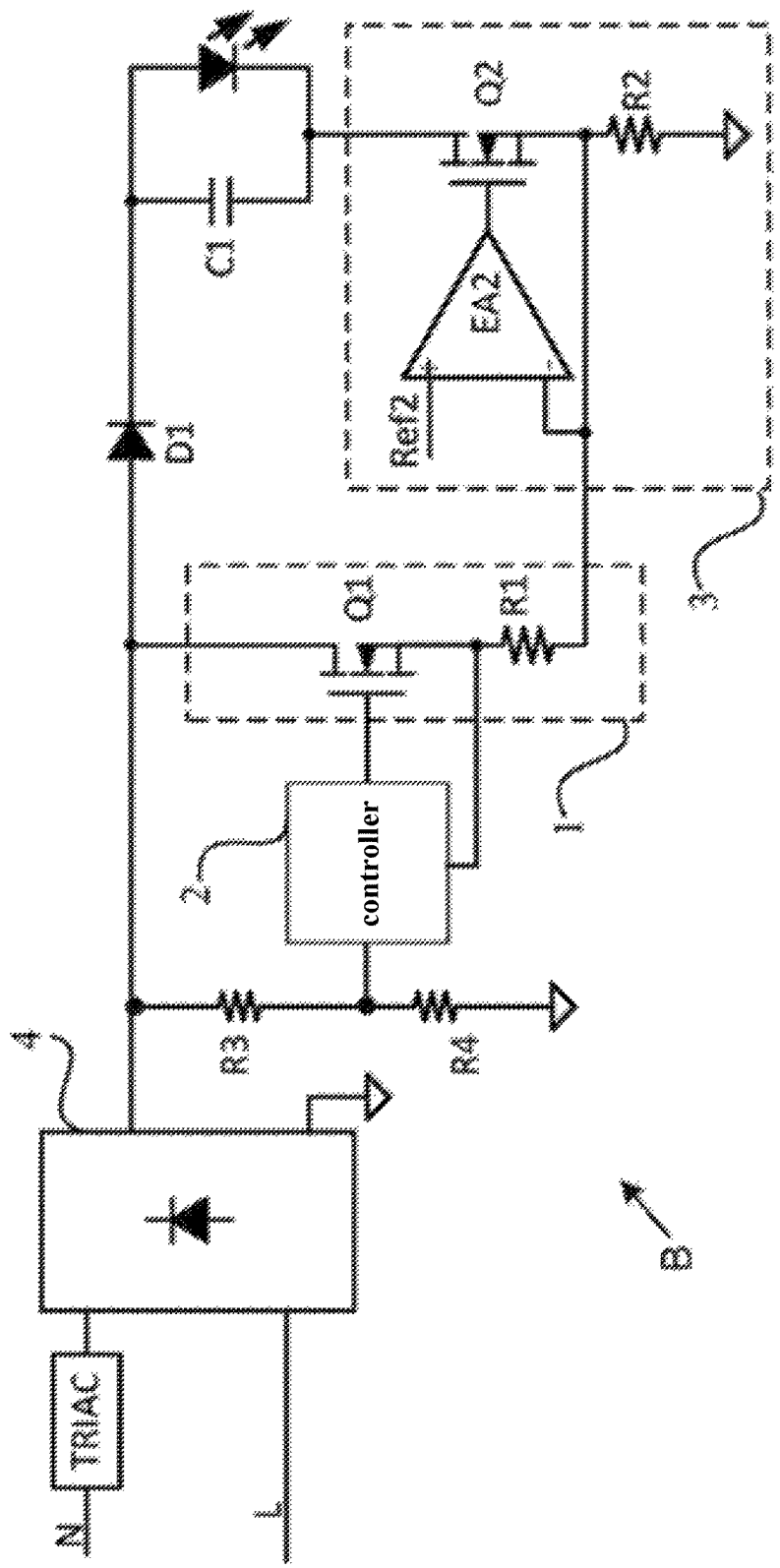
FIG. 3 is a schematic block diagram of an example LED driver, in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Silicon-controlled dimming is a type of dimming method that achieves dimming by using a phase control approach. That is, the silicon-controlled dimmer can conduct to obtain the same conduction angle at every half period of the sine wave. By adjusting the chopper phase of the silicon-controlled dimmer, the conduction angle can be changed to achieve dimming. Operation characteristics of a triode for alternating current (TRIAC) of the silicon-controlled dimmer include when the gate is triggered, the components switch from off to on, and a minimum current necessary for maintaining the conduction of the components can be referred to as the latching current. After the TRIAC is turned on, the minimum current required to maintain its conduction may be referred to as the holding current. In general, the holding current is related to the junction temperature, while the latching current is about 2-4 times greater than the holding current. While silicon-controlled dimmers were originally used to control dimming of incandescent lamps, with the popularity of light-emitting diode (LED) light sources, more and more LED drivers use silicon-controlled dimmers to control dimming.

Referring now to FIG. 1, shown is a schematic block diagram of an example LED driver. Referring also to FIG. 2, shown is a waveform diagram of example operation of the LED driver of FIG. 1. In this example, LED driver A can include silicon-controlled dimmer TRIAC, bleeder circuit 1', controller 2', constant-current control circuit 3', and rectifier circuit 4'. LED driver A may also include diode D1 connected to DC bus BUS, and filter capacitor C1 connected in parallel with the LED load. For example, silicon-controlled dimmer TRIAC can connect between rectifier circuit 4' and the AC input terminal for chopping the input AC voltage. Rectifier circuit 4' can convert AC into DC and output DC to direct current bus BUS. Constant-current control circuit 3' can connect in series with the LED load, and the current flowing through the LED load may be constant and controllable by controlling transistor Q2 to operate in a linear mode.

Constant-current control circuit 3' can include transistor Q2, resistor R2, and error amplifier EA2 for controlling transistor Q2. Transistor Q2 can connect between the LED load and resistor R2. One end of resistor R2 can connect to the source of transistor Q2. The gate of transistor Q2 can connect to the output terminal of error amplifier EA2. One input terminal of error amplifier EA2 (e.g., the non-inverting input) can receive load current reference signal Ref2, and the other input terminal (e.g., the inverting input) can connect to the source of transistor Q2. Since the current that flows through transistor Q2 may generate a voltage drop across resistor R2, the voltage at the inverting input of error amplifier EA2 can characterize the current flowing through transistor Q2, thereby causing the output of error amplifier EA2 to change along with the load current to form a current closed loop. Transistor Q2 can be controlled to operate in a linear mode by the output of error amplifier EA2, and the current flowing through transistor Q2 can be regulated such that it is consistent with (e.g., the same as) load current reference signal Ref2.

In addition, bleeder circuit 1' may generally be connected in parallel with the circuit formed by the LED load and constant-current control circuit 3'. Bleeder circuit 1' can discharge the DC bus current during the periods when silicon-controlled dimmer TRIAC is not conducting and the DC bus voltage is less than predetermined load driving voltage VLED. In FIG. 1, bleeder circuit 1' can include transistor Q1 and resistor R1. Resistor R1 can connect between the source of transistor Q1 and one end of resistor R2. Transistor Q1 can connect between DC bus BUS and resistor R1. Bleeder circuit 1' can be controlled to discharge by controller 2'. In FIG. 1, controller 2' can include error amplifier EA1, whereby the non-inverting input terminal of controller 2' may receive bleeder reference signal Ref1, the inverting input terminal may receive the voltage of the high voltage terminal of resistor R2, and the output of controller 2' can connect to the gate of transistor Q1. Bleeder reference signal Ref1 can correspond to a latching current of the TRIAC. During the period when DC bus voltage VBUS is less than the predetermined load driving voltage VLED, transistor Q2 may be turned off, and transistor Q1 can be turned on in order to operate in a linear mode for discharging.

To maintain the operation of the silicon-controlled dimmer, bleeder circuit 1' may discharge at a bleeder current greater than or equal to latching current IL until DC bus voltage VBUS is greater than load driving voltage VLED. After DC bus voltage VBUS rises above load driving voltage VLED, transistor Q2 can be controlled to operate in a linear mode to regulate the current flowing through the LED load. In addition, since the voltage input to the inverting input terminal of error amplifier EA1 may be larger than bleeder current reference signal Ref1, the output of error amplifier EA1 can be negative and transistor Q1 may be turned off. After DC bus voltage VBUS drops below the load driving voltage VLED, transistor Q2 may be turned off and transistor Q1 can be turned on again to discharge. In this example, it can be seen that in each AC period, bleeder circuit 1' may discharge the DC bus current at four different time intervals. Due to using the same bleeder current reference signal, the bleeder current can be greater than the latching current of the TRIAC, which may result in a relatively large additional loss of the system and low driver efficiency.

In one embodiment, an apparatus can include: (i) a bleeder circuit coupled to a DC bus of an LED driver having a silicon-controlled dimmer, where the bleeder circuit is controlled to discharge a current of the DC bus; (ii) a controller configured to control the bleeder circuit to discharge the DC bus at a first current after detecting a transition in a voltage of the DC bus; and (iii) the controller being configured to control the bleeder circuit to discharge the DC bus at a second current until the DC bus voltage rises to a predetermined load driving voltage, where the second current is less than the first current.

Referring now to FIG. 3, shown is a schematic block diagram of an example LED driver, in accordance with embodiments of the present invention. In this particular example, LED driver B can include silicon-controlled dimmer TRIAC, bleeder circuit 1, controller 2, constant-current control circuit 3, and rectifier circuit 4. LED driver B can also include diode D1 connected to the DC bus and filter capacitor C1 connected in parallel with the LED load. Controlling the shutdown of constant-current control circuit 3 in order to prevent the current from flowing to the load when the DC bus voltage does not reach the load driving can be implemented by any suitable control circuit structures. Further, those skilled in the art will recognize that other circuitry that can achieve the same or similar functionality of the closed-loop control. For example, a switching converter can be provided to achieve constant-current control.

In this example, bleeder circuit 1 can be controlled to discharge the DC bus current. Bleeder circuit 1 can include transistor Q1 and resistor R1 connected between transistor Q1 and resistor R2. Resistor R1 may detect the current flowing through transistor Q1 and feed back to controller 2. Transistor Q1 can be controlled by the voltage at the control terminal (e.g., the gate) to adjust the intensity of the current flowing through transistor Q1, and to discharge the DC bus current. While a metal oxide semiconductor transistor (MOSFET) is used as the component for linearly adjusting the current in this particular example, other controlled current sources or similar components and circuits, such as an insulated gate bipolar transistor IGBT or a more complicated circuit structure with a plurality of metal oxide semiconductor transistors, may be utilized in particular embodiments.

Controller 2 can control bleeder circuit 1 to discharge at a "first" current after detecting the transition in DC bus voltage VBUS. For example, bleeder circuit 1 can be controlled to discharge at the first current for a predetermined time. Then, bleed circuit 1 may be controlled to discharge at a "second" current until the DC bus voltage rises to a predetermined load driving voltage. As the silicon-controlled dimmer turns on, the DC bus voltage can change from zero to a non-zero value in a relatively short time, such that the ignition time or turn-on time of the silicon-controlled dimmer can be detected by detecting the transition in the DC bus voltage. For example, the first current may correspond to the latching current, and the second current may correspond to the holding current. In some cases, the first current may be greater than or equal to the latching current, while the second current can be greater than or equal to the holding current.

The predetermined time can correspond to the duration that the latching current may be maintained at the start up (or turn on) moment of the silicon-controlled dimmer, which can be greater than or equal to the duration required to maintain the latching current. Further, the predetermined time can be determined by prior experimental measurement data. For example, controller 2 may detect whether the DC bus voltage transitions or "jumps" (e.g., undergoes a change in the voltage level) according to a DC bus sampling signal and the delay signal of the DC bus sampling signal. For example, in order to reduce losses as much as possible, the first current may be equal to the latching current, and the second current equal to the holding current. Since the latching current may be 2-4 times of the holding current, and the duration required to maintain the latching current can be relatively short at the ignition time (or turn on moment) of the silicon-controlled dimmer, the LED driver can reduce the average bleeder current of the bleeder circuit in each period, thereby reducing bleeder losses and improving the overall efficiency of the LED driver.

Controller 2 can also control bleeder circuit 1 to discharge at a second current while detecting that DC bus voltage VBUS has fallen below a predetermined load driving voltage VLED. Thus, controller 2 may not only discharge at the first current in a predetermined time after detecting the transition in the DC bus voltage, but can also control transistor Q1 to turn off or discharge at the smaller second current in other time periods. In this way, potential bleeder losses can be further reduced. For example, controller 2 can achieve the above objective by switching bleeder current reference signal Refx used for control. In FIG. 3, controller 2 can acquire the DC bus voltage sampling signal through a resistance voltage divider (e.g., including the resistors R3 and R4) connected between DC bus BUS and ground. Of course, controller 3 can also directly detect the DC bus voltage for control. For example, the bleeder circuit and the controller may be formed in an integrated circuit, or may be constructed by separate components (e.g., bleeder circuit 1, controller 2 in the same integrated circuit chip as constant-current control circuit 3 and/or the rectifier circuit).

Figure 4:
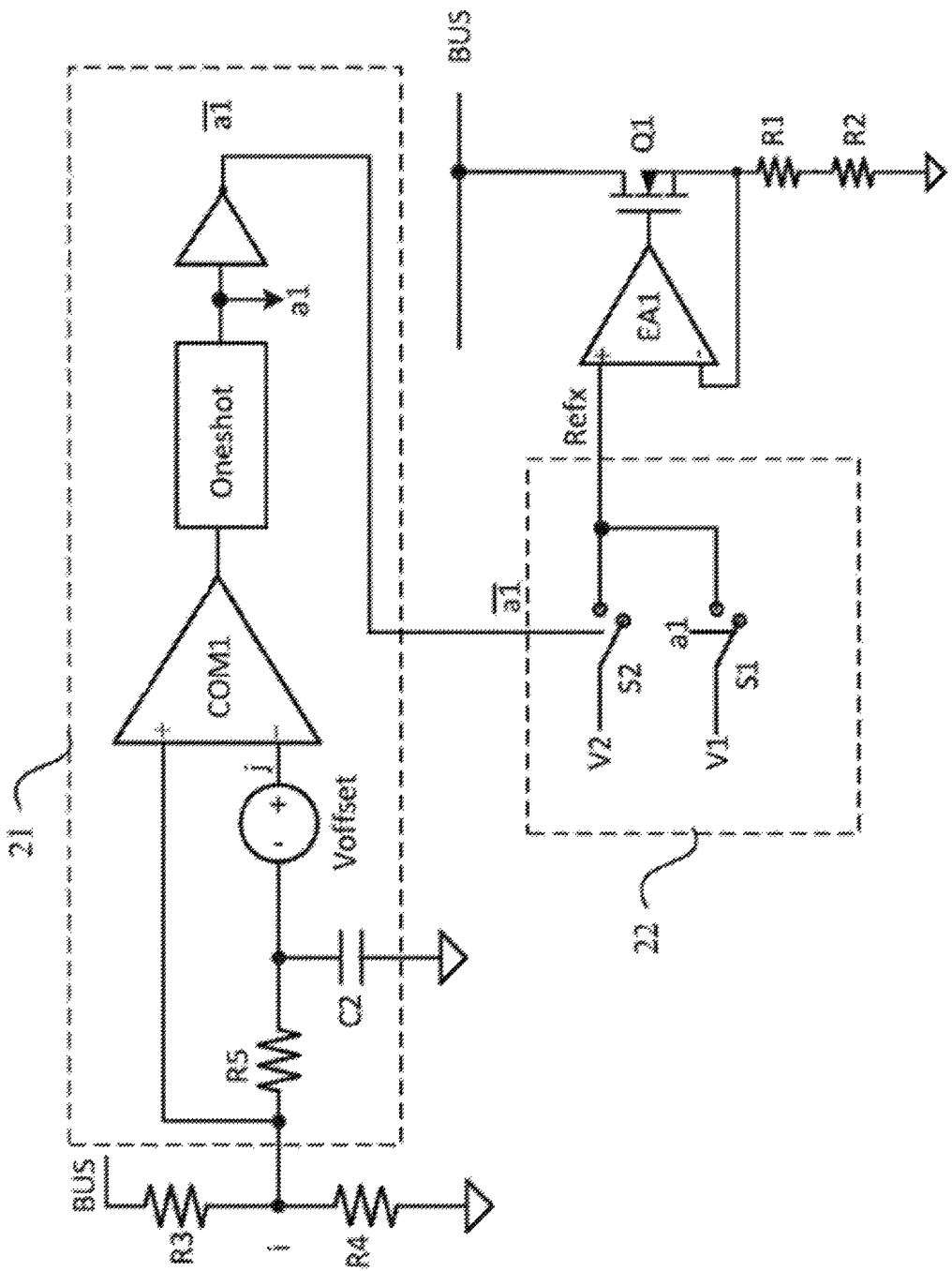
FIG. 4 is a schematic block diagram of an example controller, in accordance with embodiments of the present invention.

Referring now to FIG. 4, shown is a schematic block diagram of an example controller, in accordance with embodiments of the present invention. In this particular example, controller 2 can include mode-selection circuit 21, current reference signal switching circuit 22, and error amplifier EA1. Mode-selection circuit 21 may generate selection signal a1, whereby the selection signal involves selection of a first voltage is output in a predetermined time after detecting the transition in the DC bus voltage. For example, mode-selection circuit 21 can include comparator COM1, a delay circuit, bias voltage source Voffset, and one-shot circuit "Oneshot." One input terminal (e.g., non-inverting) of comparator COM1 can connect to input terminal i of the DC bus voltage sampling signal.

The delay circuit can delay the signal of the first input terminal by a predetermined time for obtaining a delayed waveform. The delay circuit in FIG. 4 is an RC circuit that includes a resistor R5 and a capacitor C2. The delay circuit and bias voltage source Voffset can connect in series between input terminal i of the DC bus voltage sampling signal and input terminal j of comparator COM1. Thus, the two input terminals of comparator COM1 can receive voltage Vi at input terminal i, and voltage Vj at input terminal j. One-shot circuit "Oneshot" may generate pulse signal a1 having a predetermined time length as a selection signal according to the switching of the output signal of the comparator. In this example, one-shot circuit Oneshot may output a pulse having a predetermined time responding to the rising edge of the input signal. It should be understood that one-shot circuit Oneshot may alternatively be set to trigger at the falling-edge according to the different connection relationship.

Current reference switching circuit 22 may select voltage V1 or voltage V2 as bleeder current reference signal Refx according to selection signal a1. As described herein, voltage V1 can correspond to the first current, and voltage V2 can correspond to the second current. That is, when voltage V1 is used as the bleeder current reference signal, bleeder circuit 1 can be controlled to discharge at the first current. When voltage V2 is used as the bleeder current reference signal, bleeder circuit 1 can be controlled to discharge at the second current. In FIG. 4, current reference signal switching circuit 22 can include switches S1 and S2. One end of switch S1 can connect to the non-inverting terminal of error amplifier EA1, and the other end can connect to voltage V1. One end of switch S2 can connect to the non-inverting terminal of error amplifier EA1, and the other end can connect to voltage V2. Switch S1 may be controlled by selection signal a1, and switch S2 may be controlled by the inverted version of selection signal a1. Therefore, at any given time, only one of switches S1 and S2 may be turned on, such that only one of voltages V1 and V2 can be output therefrom.

Figure 5:
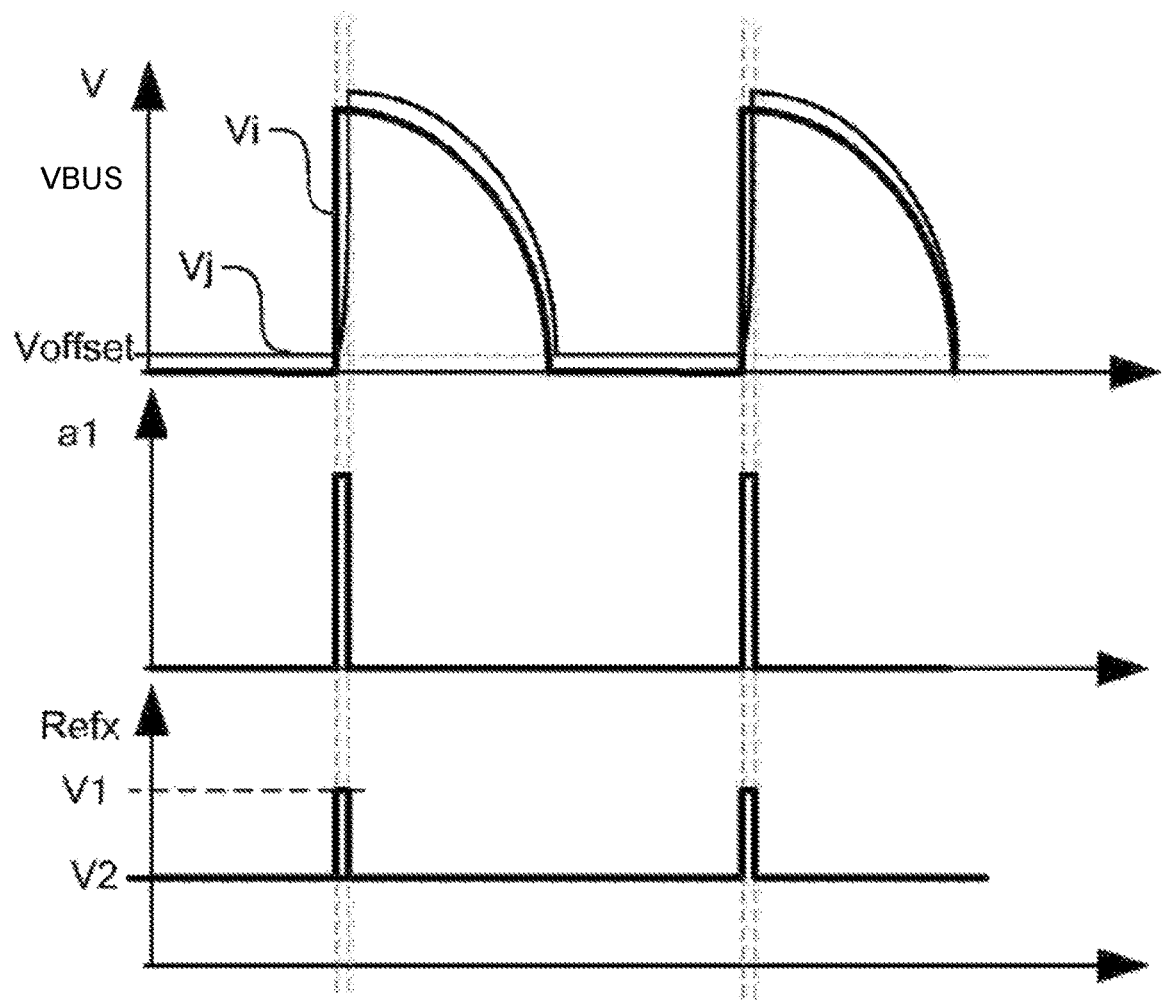
FIG. 5 is a waveform diagram of example operation of this example controller, in accordance with embodiments of the present invention.

Referring now to FIG. 5, shown is a waveform diagram of example operation of this example controller, in accordance with embodiments of the present invention. In this example, when the silicon-controlled dimmer is not turned on, DC bus voltage VBUS is zero and the corresponding DC bus voltage sampling signal (e.g., voltage Vi at input terminal i) is zero. When the silicon-controlled dimmer is turned on, DC bus voltage VBUS can transition to a non-zero value, and DC bus voltage VBUS can change in a sinusoidal waveform until it crosses zero. In addition, voltage Vi at input terminal i may have the same change waveform as DC bus voltage VBUS. Voltage Vj at input terminal j may be a delayed and biased version of voltage Vi, and the voltage waveform of voltage Vj may lag behind voltage Vi and be superposed on bias voltage Voffset. In this example, when the voltage waveform is not drastically changed, voltage Vj is greater than voltage Vi due to the superposition of the bias voltage.

However, when the DC bus voltage transitions, voltage Vi may be greater than voltage Vj since voltage Vi can significantly change in a relatively short period of time, such that comparator COM1 may output a rising edge. One-shot circuits Oneshot may respond to the rising edge and activate pulse signal a1 for a predetermined time. Switch S1 can be turned on in response to selection signal a1, switch S2 may be turned off, and higher voltage V1 can be provided as the bleeder current reference signal. Further, error amplifier EA1 can control bleeder circuit 1 to discharge at a first current based on voltage V1, that is, V1/(R1+R2). After the predetermined time has elapsed, selection signal a1 may go low, and switch S1 can be turned off in response to selection signal a1. Also, switch S2 may be turned on, and lower voltage V2 may be provided as bleeder reference signal Refx. Further, error amplifier EA1 can control bleeder circuit 1 to discharge at a second current based on voltage V2 [e.g., V2/(R1+R2)].

Figure 6:
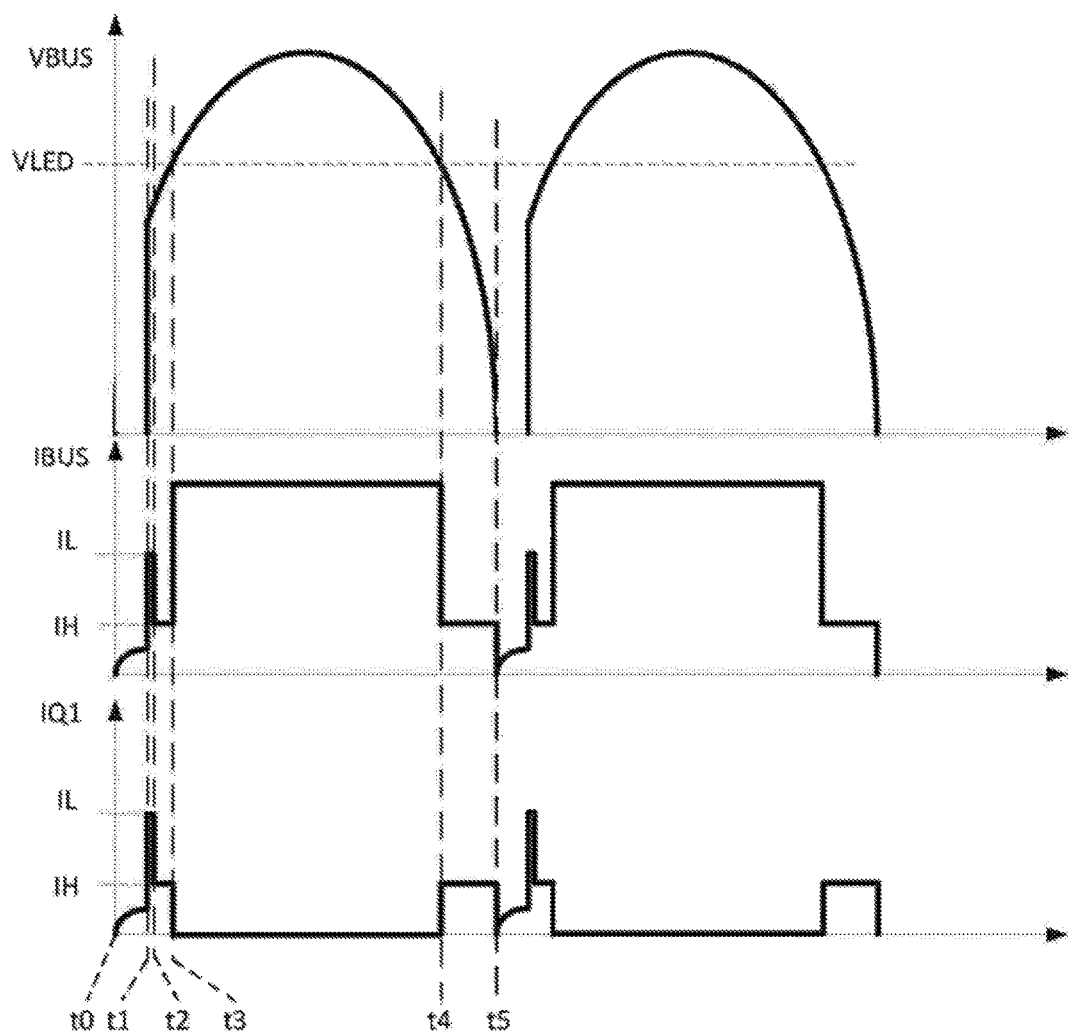
FIG. 6 is a waveform diagram of example operation of this example LED driver, in accordance with embodiments of the present invention.

Referring now to FIG. 6, shown is a waveform diagram of example operation of this example LED driver, in accordance with embodiments of the present invention. In this particular example, silicon-controlled dimmer TRIAC may not conduct during the period t0-t1, and DC bus voltage VBUS is zero. During this time period, transistor Q2 may remain off, the current flowing through the load can be zero, and transistor Q1 may turn on and a certain amount of current can accordingly be discharged. At time t1, silicon-controlled dimmer TRIAC can turn on, causing voltage VBUS of the DC bus to transition or jump. After detecting the transition/jump, controller 2 can control bleeder circuit 1 to discharge at the first current equal to or greater than latching current IL for a predetermined time (e.g., t1 to t2). After this predetermined time, controller 2 can control bleeder circuit 1 to discharge at the second current equal to or greater than holding current IH until DC bus voltage VBUS rises to predetermined load driving voltage VLED (t2 to t3).

During the period t3 to t4, transistor Q2 may be turned on, transistor Q1 can be turned off, and the DC bus current may drive the LED load to operate. At time t4, DC bus voltage VBUS can drop below load driving voltage VLED. Transistor Q2 may again be turned off and transistor Q1 turned on. During the period t4 to t5, control circuit 2 can control bleeder circuit 1 to discharge at the second current until the DC bus voltage crosses zero. In this example, bleeder current IQ1 may be much smaller than latching current IL between t2 and t3, and between t4 and t5. The system loss can thus be calculated according to formula (1) below.

$$\int_{t0}^{t3} (VBUS \times IQ1) \, dt + \int_{t4}^{t5} (VBUS \times IQ1) \, dt \quad (1)$$

Since bleeder current IQ1 equals the first current for a short time, the bleeder loss of the present example may be greatly reduced as compared to other approaches, thereby improving the system efficiency. In another example, after DC bus voltage VBUS can drop from the peak value to less than load driving voltage VLED, the lighting period of the LED load may be completed, and it may not be necessary to maintain silicon-controlled dimmer TRIAC to keep operating until the beginning of the next period. Therefore, it may be possible to discharge at a smaller current to further reduce the loss during this time period. For example, controller 2 can control the bleeder circuit to discharge at a third current after detecting that DC bus voltage VBUS has fallen below a predetermined load driving voltage. For example, the third current can be less than the second current and the holding current of silicon-controlled dimmer TRIAC.

Figure 7:
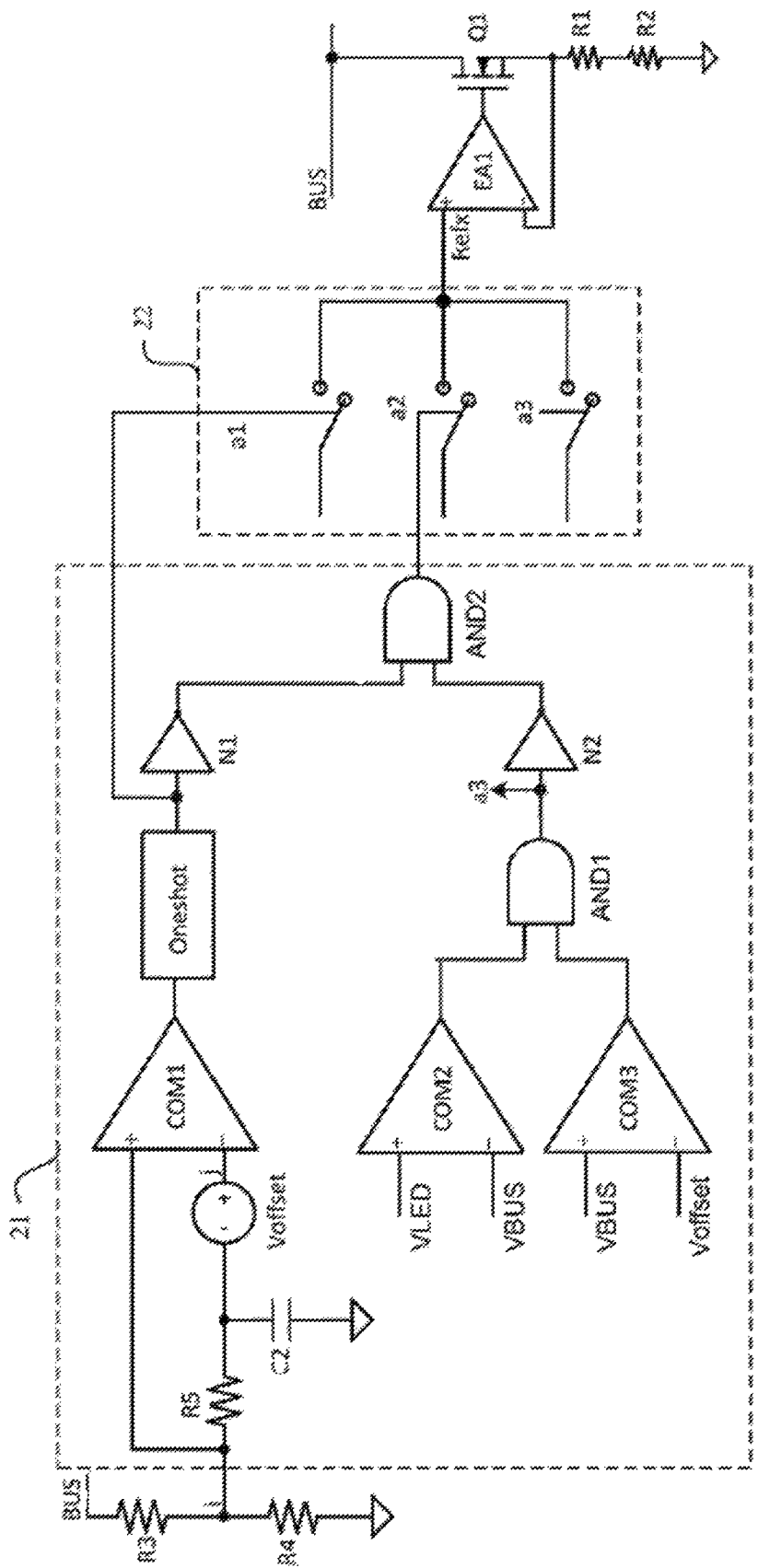
FIG. 7 is a schematic block diagram of another example controller, in accordance with embodiments of the present invention.

Referring now to FIG. 7, shown is a schematic block diagram of another example controller, in accordance with embodiments of the present invention. In this particular example, controller 2 can include mode-selection circuit 21, current reference signal switching circuit 22, and error amplifier 23. Mode-selection circuit 21 may output a selection signal involving selection of the first voltage within a predetermined time after detecting a transition in the DC bus voltage, and may output a selection signal characterizing selection of the "third" voltage after detecting that the DC bus voltage has dropped to less than a predetermined load driving voltage. Also, mode-selection circuit 21 can output the selection signal characterizing the selection of the second voltage in the remaining period of time. Current reference signal switching circuit 22 can select one of voltages V1, V2, and V3 as bleeder current reference signal Refx according to the selection signal. Error amplifier EA1 may receive the bleeder current reference signal Refx and the bleeder current sampling signal, and output the control signal for controlling bleeder circuit 1.

Mode-selection circuit 21 can include comparator COM1, a delay circuit, bias voltage source Voffset, one-shot circuit "Oneshot," and first and second logic circuits. For example, a first input terminal of comparator COM1 can connect to input terminal i of the DC bus voltage sampling signal. The delay circuit can delay the signal of input terminal i by a predetermined time to obtain a delayed waveform. The delay circuit in this example is an RC circuit that can include resistor R5 and capacitor C2. The delay circuit and bias current source Voffset can connect in series between input terminal i of the DC bus voltage sampling signal and input terminal j of comparator COM1. As shown, the two input terminals of comparator COM1 can receive voltage Vi at input terminal i and voltage Vj at input terminal j.

One-shot circuit "Oneshot" may output pulse signal a1 having a predetermined time as a selection signal according to the output signal of the comparator. In this example, one-shot circuit Oneshot can output a pulse having a predetermined time in response to the rising edge of the input signal. It should be understood that one-shot circuit Oneshot may also be set to trigger at the falling-edge, depending on the particular connection relationships of the circuit. The "first" logic circuit can include comparator COM2, comparator COM3, and AND-gate AND1. The first logic circuit can output a valid selection sub-signal a3 when the DC bus voltage VBUS is less than the predetermined load driving voltage VLED and greater than bias voltage Voffset of the bias voltage source.

For example, comparator COM2 can compare load driving voltage VLED with DC bus voltage VBUS, comparator COM3 can compare DC bus voltage VBUS with bias voltage Voffset, and AND-gate AND1 may output a high level signal a3 when the outputs of both comparators are high level. The "second" logic circuit can include inverter N1, inverter N2, and AND-gate AND2. The second logic circuit can activate selection sub-signal a2 when both of selection sub-signals a1 and a3 are deactivated. Selection sub-signals a1, a2, and a3 may form a three-bit selection signal in this particular example.

In addition, current reference switching circuit 22 can output one of voltages V1, V2, and V3 according to the three selection sub-signals. Current reference switching circuit 22 can include switches S1, S2, and S3. One end of switches S1, S2, and S3 can connect to the non-inverting terminal of error amplifier EA1, and the other ends of these switches may respectively receive voltages V1, V2, and V3. Switch S1 can be controlled by signal a1, switch S2 can be controlled by signal a2, and switch S3 can be controlled by signal a3. Thus at any given time, only one of these three switches is turned on.

Figure 8:
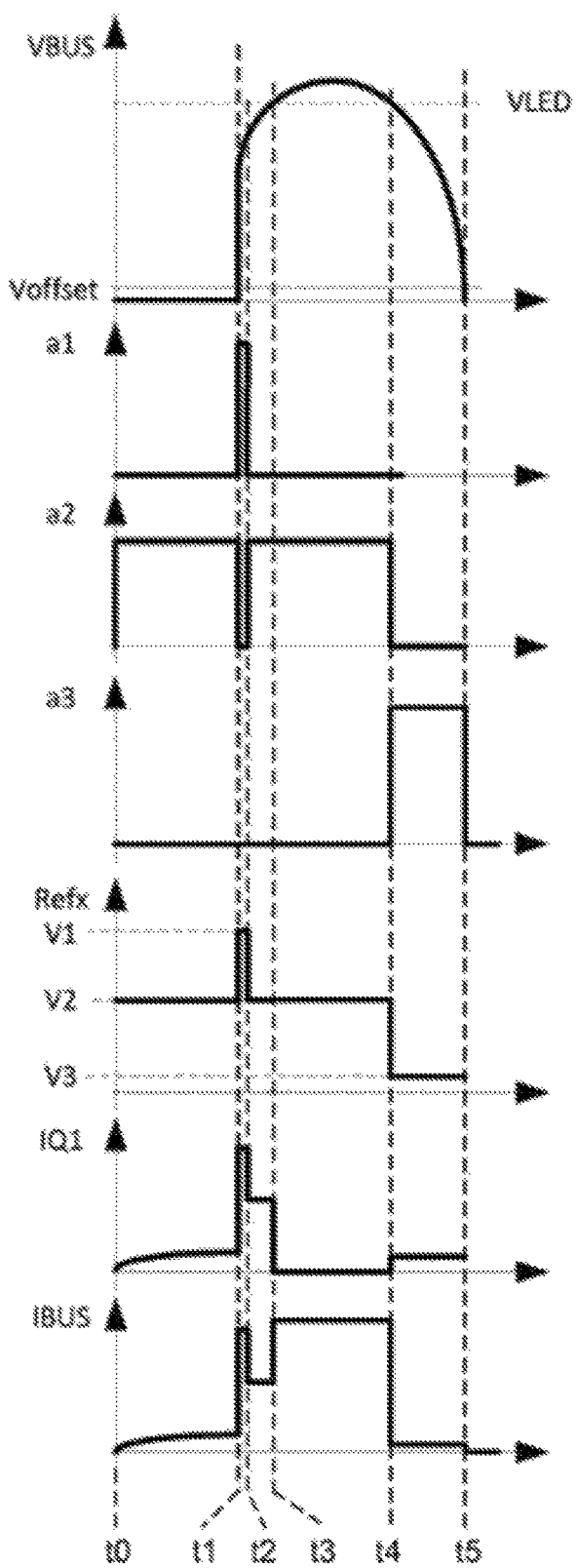
FIG. 8 is a waveform diagram of example operation of this example LED driver, in accordance with embodiments of the present invention.

Referring now to FIG. 8, shown is a waveform diagram of example operation of this example LED driver, in accordance with embodiments of the present invention. In this example, during time period t0-t1, silicon-controlled dimmer TRIAC may not conduct, and the DC bus voltage VBUS is zero. During this time period, transistor Q2 may remain off, the current flowing through the load is zero, and transistor Q1 can turn on and a certain amount of current is discharged. At time t1, silicon-controlled dimmer TRIAC may turn on, which can cause voltage VBUS of the DC bus to transition or jump to a higher voltage level. After detecting the transition, controller 2 can control bleeder circuit 1 to discharge at the first current being equal to or greater than latching current IL for a predetermined period of time (e.g., t1 to t2). After the predetermined time has elapsed, controller 2 can control bleeder circuit 1 to discharge at the second current being equal to or greater than holding current IH until DC bus voltage VBUS rises to predetermined load driving voltage VLED (e.g., t2 to t3).

For example, the second current is less than the first current. During period t3 to t4, transistor Q2 may be turned on, transistor Q1 can be turned off, and the DC bus current can drive the LED load to operate. At time t4, DC bus voltage VBUS may drop below load driving voltage VLED. Transistor Q2 can again be turned off, and transistor Q1 turned on. During the period t4 to t5, control circuit 2 can control bleeder circuit 1 to discharge at the third current until the DC bus voltage crosses zero. In this example, the third current may be set to be as low as possible. As a result, during period t4 to t5, bleeder circuit 1 may discharge at a relatively low current, thereby minimizing losses and optimizing system efficiency.

Figure 9:
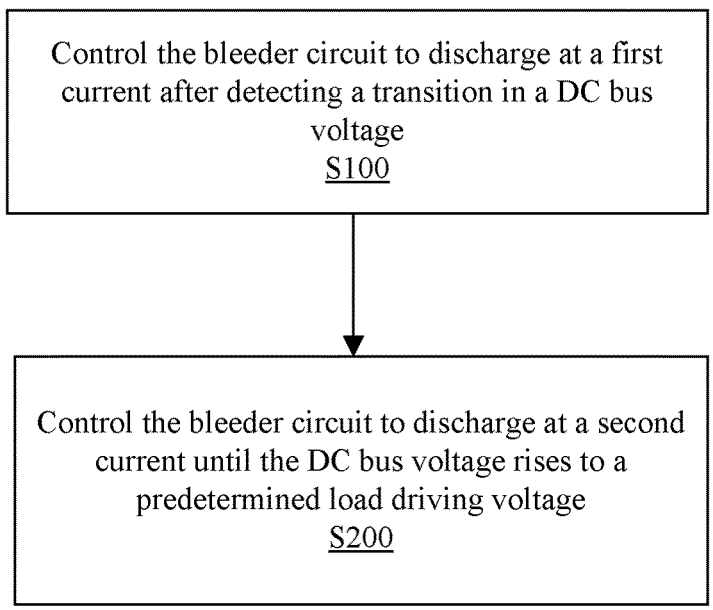
FIG. 9 is a flow diagram of an example method of controlling an LED driver, in accordance with embodiments of the present invention.

Referring now to FIG. 9, shown is a flow diagram of an example method of controlling an LED driver, in accordance with embodiments of the present invention. For example, the method can include, at S100, controlling the bleeder circuit to discharge at a first current after detecting a transition in a DC bus voltage. For example, the bleeder circuit may be controlled to discharge at the first current for a predetermined time. Detection of whether the DC bus voltage transitions can be made according to the difference between a DC bus sampling signal and a delay signal of the DC bus sampling signal. At S200, the bleeder circuit can be controlled to discharge at a second current until the DC bus voltage rises to a predetermined load driving voltage. Further, the bleeder circuit can be controlled to discharge at the second current or a third current after the bus voltage drops to less than the predetermined load driving voltage. For example, the bleeder circuit is controlled to discharge at different currents by switching the bleeder current reference voltage.

For example, the first current can be greater than the second current, and the second current greater than the third current. The first current may correspond to the latching current of the silicon-controlled dimmer TRIAC, which can be set to be greater than or equal to the latching current. The second current can correspond to the holding current of the silicon-controlled dimmer TRIAC, and may be set to be greater than or equal to the holding current. The third current may be as low as possible under the permitted conditions, in order to minimize the losses.

Therefore, in this example, by distinguishing the bleeder current during the initial turn-on phase of the silicon-controlled dimmer, and the bleeder current during the phase after the silicon-controlled dimmer is turned on until the LED load is lit in each AC cycle, by controlling the bleeder circuit to discharge at a larger first current during the initial turn-on phase of the silicon-controlled dimmer, and by controlling the bleeder circuit to discharge at a smaller second current after the silicon-controlled dimmer is turned on, the average bleeder current of the bleeder circuit in each cycle may be reduced in order to reduce bleeder loss and improve the efficiency of the LED driver.

It should be understood that although the above describes that the controller is constructed using analog circuitry, those skilled in the art can understood that the controller can additionally or alternatively be constructed by using a digital circuitry and a digital-to-analog/digital conversion device(s). The digital circuitry may be can be implemented in one or more dedicated circuit blocks (ASICs), digital signal processors (DSPs), digital signal processing devices (DSPDs), programmable logic devices (PLDs), field programmable gate arrays (FPGAs), processors, controllers, microcontrollers, microprocessors, or other electronic units or combinations thereof configured to perform the circuit functions as described herein. Particular embodiments may also be implemented with hardware in combination with firmware or software implementations (e.g., procedures, functions, etc.) that can perform various functions as described herein, whereby such software/code can be stored in memory and executed by a processor, whereby the memory may be implemented within the processor or outside the processor.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. An apparatus, comprising:
   a) a bleeder circuit coupled to a DC bus of a light-emitting diode (LED) driver having a silicon-controlled dimmer, wherein said bleeder circuit is controlled to discharge a current of said DC bus;
   b) a controller configured to control said bleeder circuit to discharge said DC bus at a first current after detecting a transition in a voltage of said DC bus; and
   c) said controller being configured to control said bleeder circuit to discharge said DC bus at a second current until said DC bus voltage rises to a predetermined load driving voltage, wherein said second current is less than said first current.

2. The apparatus of claim 1, wherein said controller is configured to control said bleeder circuit to discharge at said first current for a predetermined time after detecting said transition in said DC bus voltage.

3. The apparatus of claim 1, wherein said controller is configured to control said bleeder circuit to discharge at said second current after detecting that said DC bus voltage has fallen below said predetermined load driving voltage.

4. The apparatus of claim 1, wherein said controller is configured to control said bleeder circuit to discharge at a third current after detecting that said DC bus voltage has fallen below said predetermined load driving voltage, wherein said third current is less than said second current.

5. The apparatus of claim 1, wherein said first current is greater than or equal to a latching current of said silicon-controlled dimmer, and said second current is greater than or equal to a holding current of said silicon-controlled dimmer.

6. The apparatus of claim 4, wherein:
   a) said first current is equal to said latching current of said silicon-controlled dimmer;
   b) said second current is equal to said holding current of said silicon-controlled dimmer; and
   c) and said third current is less than said holding current of said silicon-controlled dimmer.

7. The apparatus of claim 1, wherein said controller is configured to detect whether said DC bus voltage transitions according to a DC bus sampling signal and a delay signal of said DC bus sampling signal.

8. The apparatus of claim 1, wherein said controller is configured to control said bleeder circuit to discharge at different currents by switching a bleeder current reference voltage.

9. The apparatus of claim 1, wherein said bleeder circuit comprises a controlled-current source coupled between said DC bus and ground, and said controller comprises:
   a) an error amplifier configured to receive a bleeder current reference signal and a bleeder current sampling signal, and to generate a control signal to control said controlled-current source;
   b) a current reference signal switching circuit configured to select a first voltage or a second voltage as said bleeder current reference signal according to a selection signal; and
   c) a mode selection circuit configured to output said first voltage as said selection signal within a predetermined time after detecting said transition in said DC bus voltage, wherein said first voltage corresponds to said first current, and wherein said second voltage corresponds to said second current.

10. The apparatus of claim 9, wherein said mode selection circuit comprises:
    a) a comparator having a first input terminal configured to receive said DC bus voltage sampling signal;
    b) a delay circuit and a bias voltage source coupled in series between an input terminal of said DC bus voltage sampling signal and a second input terminal of said comparator; and
    c) a one-shot circuit configured to output a pulse signal having a predetermined time length as said selection signal according to an output of said comparator.

11. The apparatus of claim 4, wherein said bleeder circuit comprises a controlled-current source coupled between said DC bus and said ground terminal, and said controller comprises:

a) an error amplifier configured to receive a bleeder current reference signal and a bleeder current sampling signal, and to generate a control signal to control said controlled-current source;

b) a current reference signal switching circuit configured to select one of a first voltage, a second voltage, and a third voltage as said bleeder current reference signal according to a selection signal; and c) a mode selection circuit configured to output said first voltage as said selection signal for a predetermined time after detecting said transition in said DC bus voltage, and said third voltage as said selection signal after detecting that said DC bus voltage has fallen below said predetermined load driving voltage, wherein said first voltage corresponds to said first current, said second voltage corresponds to said second current, and said third voltage corresponds to said third current.

12. The apparatus of claim 11, wherein said mode selection circuit comprises:

a) a comparator having a first input terminal configured to receive a DC bus voltage sampling signal;

b) a delay circuit and a bias voltage source coupled in series between an input terminal of said DC bus voltage sampling signal and a second input terminal of said comparator;

c) a one-shot circuit configured to output a pulse signal having a predetermined time length as a first selection sub-signal according to an output of said comparator;

d) a first logic circuit configured to activate a third selection sub-signal when said DC bus voltage is less than said predetermined load driving voltage and greater than a bias voltage of said bias voltage source; and e) a second logic circuit configured to activate a second selection sub-signal when both said first and third selection sub-signals are deactivated, wherein said bleeder current reference signal switching circuit outputs said first voltage when said first selection sub-signal is active, said second voltage when said second selection sub-signal is active, and said third voltage when said third selection sub-signal is valid.

13. A method of controlling a bleeder circuit coupled to a DC bus of a light-emitting diode (LED) driver having a silicon-controlled dimmer, the method comprising:

a) controlling said bleeder circuit to discharge said DC bus at a first current after detecting a transition in a voltage of said DC bus; and b) controlling said bleeder circuit to discharge said DC bus at a second current until said DC bus voltage rises to a predetermined load driving voltage, wherein said second current is less than said first current.

14. The method of claim 13, wherein said controlling said bleeder circuit to discharge at said first current comprises controlling said bleeder circuit to discharge at a first current for a predetermined time.

15. The method of claim 13, further comprising controlling said bleeder circuit to discharge at said second current after detecting that said DC bus voltage has fallen below said predetermined load driving voltage.

16. The method of claim 13, further comprising controlling said bleeder circuit to discharge at a third current after detecting that said DC bus voltage has fallen below said predetermined load driving voltage, wherein said third current is less than said second current.

17. The method of claim 13, wherein said first current is greater than or equal to a latching current of said silicon-controlled dimmer, and said second current is greater than or equal to a holding current of said silicon-controlled dimmer.

18. The method of claim 16, wherein:

a) said first current is equal to said latching current of said silicon-controlled dimmer;

b) said second current is equal to said holding current of said silicon-controlled dimmer; and c) and said third current is less than said holding current of said silicon-controlled dimmer.

19. The method of claim 13, wherein said detecting transition of said DC bus voltage comprises determining a difference between a DC bus sampling signal and a delay signal of said DC bus sampling signal.

20. The method of claim 13, further comprising switching a bleeder current reference voltage for controlling said bleeder circuit to discharge at different currents.

* * * * *